(12) United States Patent
Liu (10) Patent No.: US 12,333,770 B2
(45) Date of Patent: Jun. 17, 2025

(54) VEHICULAR CAMERA WITH POLARIZATION FILTER

(71) Applicant: Magna Electronics Inc., Auburn Hills, MI (US)

(72) Inventor: Xiyuan Liu, Moembris (DE)

(73) Assignee: Magna Electronics Inc., Auburn Hills, MI (US)

( * ) Notice: Subject to any disclaimer, the term of this patent is extended or adjusted under 35 U.S.C. 154(b) by 146 days.

(21) Appl. No.: 18/315,601

(22) Filed: May 11, 2023

(65) Prior Publication Data

US 2024/0378838 A1     Nov. 14, 2024

Related U.S. Application Data (60) Provisional application No. 63/364,681, filed on May 13, 2022.

(51) Int. Cl.
| | |
|---|---|
| *G06V 10/147* | (2022.01) |
| *B60R 1/12* | (2006.01) |
| *G02B 5/30* | (2006.01) |
| *G06V 20/52* | (2022.01) |
| *G06V 20/59* | (2022.01) |
| *G06V 40/10* | (2022.01) |
| *H04N 23/56* | (2023.01) |
| *H04N 25/76* | (2023.01) |

(52) U.S. Cl.
CPC .......... *G06V 10/147* (2022.01); *B60R 1/1207* (2013.01); *G06V 20/52* (2022.01); *G06V 20/59* (2022.01); *G06V 40/10* (2022.01); *H04N 23/56* (2023.01); *H04N 25/76* (2023.01); *B60R 2001/1253* (2013.01); *G02B 5/30* (2013.01)

(58) Field of Classification Search
CPC ...... G06V 10/147; G06V 20/52; G06V 20/59; G06V 40/10; B60R 1/1207; B60R 2001/1253; H04N 23/56; H04N 25/76; G02B 5/30
See application file for complete search history.

(56) References Cited

U.S. PATENT DOCUMENTS

| | | | |
|---|---|---|---|
| 4,435,042 | A | 3/1984 | Wood et al. |
| 4,436,371 | A | 3/1984 | Wood et al. |
| 4,712,879 | A | 12/1987 | Lynam et al. |
| 4,826,289 | A | 5/1989 | Vandenbrink et al. |
| 4,936,533 | A | 6/1990 | Adams et al. |
| 4,948,242 | A | 8/1990 | Desmond et al. |
| 5,066,112 | A | 11/1991 | Lynam et al. |
| 5,073,012 | A | 12/1991 | Lynam |
| 5,076,673 | A | 12/1991 | Lynam et al. |
| 5,076,674 | A | 12/1991 | Lynam |
| 5,100,095 | A | 3/1992 | Haan et al. |
| 5,115,346 | A | 5/1992 | Lynam |

(Continued)

*Primary Examiner* — Nasim N Nirjhar
(74) *Attorney, Agent, or Firm* — HONIGMAN LLP (57) ABSTRACT

A vehicular occupant monitoring system includes a camera disposed at an interior rearview mirror of a vehicle. A polarization filter is disposed between an imaging array sensor of the camera and occupants of the vehicle such that light reflected off of the occupants of the vehicle passes through the polarization filter prior to reaching the imaging array sensor. The vehicular occupant monitoring system, responsive to processing by the image processor of image data captured by the camera, determines presence of an occupant of the vehicle.

21 Claims, 5 Drawing Sheets

(56) References Cited

U.S. PATENT DOCUMENTS

| | | |
|---|---|---|
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,327,288 A | 7/1994 | Wellington |
| 5,406,414 A | 4/1995 | O'Farrell et al. |
| 5,525,264 A | 6/1996 | Cronin et al. |
| 5,550,677 A | 8/1996 | Schofield et al. |
| 5,567,360 A | 10/1996 | Varaprasad et al. |
| 5,570,127 A | 10/1996 | Schmidt |
| 5,594,222 A | 1/1997 | Caldwell |
| 5,610,756 A | 3/1997 | Lynam et al. |
| 5,668,663 A | 9/1997 | Varaprasad et al. |
| 5,670,935 A | 9/1997 | Schofield et al. |
| 5,715,093 A | 2/1998 | Schierbeek et al. |
| 5,724,187 A | 3/1998 | Varaprasad et al. |
| 5,751,489 A | 5/1998 | Caskey et al. |
| 5,760,962 A | 6/1998 | Schofield et al. |
| 5,796,094 A | 8/1998 | Schofield et al. |
| 5,820,097 A | 10/1998 | Spooner |
| 5,877,897 A | 3/1999 | Schofield et al. |
| 5,910,854 A | 6/1999 | Varaprasad et al. |
| 6,001,486 A | 12/1999 | Varaprasad et al. |
| 6,002,511 A | 12/1999 | Varaprasad et al. |
| 6,097,023 A | 8/2000 | Schofield et al. |
| 6,154,306 A | 11/2000 | Varaprasad et al. |
| 6,158,655 A | 12/2000 | DeVries, Jr. et al. |
| 6,178,034 B1 | 1/2001 | Allemand et al. |
| 6,201,642 B1 | 3/2001 | Bos |
| 6,222,447 B1 | 4/2001 | Schofield et al. |
| 6,310,611 B1 | 10/2001 | Caldwell |
| 6,318,870 B1 | 11/2001 | Spooner et al. |
| 6,320,176 B1 | 11/2001 | Schofield et al. |
| 6,320,282 B1 | 11/2001 | Caldwell |
| 6,329,925 B1 | 12/2001 | Skiver et al. |
| 6,369,804 B1 | 4/2002 | Sandbach |
| 6,396,397 B1 | 5/2002 | Bos et al. |
| 6,437,258 B1 | 8/2002 | Sandbach |
| 6,449,082 B1 | 9/2002 | Agrawal et al. |
| 6,452,479 B1 | 9/2002 | Sandbach |
| 6,480,103 B1 | 11/2002 | McCarthy et al. |
| 6,483,438 B2 | 11/2002 | DeLine et al. |
| 6,485,081 B1 | 11/2002 | Bingle et al. |
| 6,492,980 B2 | 12/2002 | Sandbach |
| 6,498,620 B2 | 12/2002 | Schofield et al. |
| 6,501,465 B2 | 12/2002 | Sandbach |
| 6,504,531 B1 | 1/2003 | Sandbach |
| 6,540,193 B1 | 4/2003 | DeLine |
| 6,552,342 B2 | 4/2003 | Holz et al. |
| 6,559,435 B2 | 5/2003 | Schofield et al. |
| 6,590,719 B2 | 7/2003 | Bos |
| 6,593,565 B2 | 7/2003 | Heslin et al. |
| 6,598,980 B2 | 7/2003 | Marusawa et al. |
| 6,621,411 B2 | 9/2003 | McCarthy et al. |
| 6,627,918 B2 | 9/2003 | Getz et al. |
| 6,690,268 B2 | 2/2004 | Schofield et al. |
| 6,698,905 B1 | 3/2004 | Whitehead |
| 6,703,925 B2 | 3/2004 | Steffel |
| 6,717,610 B1 | 4/2004 | Bos et al. |
| 6,757,109 B2 | 6/2004 | Bos |
| 6,768,420 B2 | 7/2004 | McCarthy et al. |
| 6,783,167 B2 | 8/2004 | Bingle et al. |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,877,709 B2 | 4/2005 | March et al. |
| 6,922,292 B2 | 7/2005 | Bos |
| 6,946,978 B2 | 9/2005 | Schofield |
| 7,004,606 B2 | 2/2006 | Schofield |
| 7,038,577 B2 | 5/2006 | Pawlicki et al. |
| 7,097,226 B2 | 8/2006 | Bingle et al. |
| 7,184,190 B2 | 2/2007 | McCabe et al. |
| 7,188,963 B2 | 3/2007 | Schofield et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,420,756 B2 | 9/2008 | Lynam |
| 7,446,924 B2 | 11/2008 | Schofield et al. |
| 7,477,758 B2 | 1/2009 | Piirainen et al. |
| 7,480,149 B2 | 1/2009 | DeWard et al. |
| 7,626,749 B2 | 12/2009 | Baur et al. |
| 7,636,188 B2 | 12/2009 | Baur et al. |
| 7,720,580 B2 | 5/2010 | Higgins-Luthman |
| 7,722,199 B2 | 5/2010 | DeWard et al. |
| 7,741,666 B2 | 6/2010 | Nozaki et al. |
| 7,855,755 B2 | 12/2010 | Weller et al. |
| 7,914,187 B2 | 3/2011 | Higgins-Luthman et al. |
| 8,049,640 B2 | 11/2011 | Uken et al. |
| 8,256,821 B2 | 9/2012 | Lawlor et al. |
| 8,258,932 B2 | 9/2012 | Wahlstrom |
| 8,277,059 B2 | 10/2012 | McCabe et al. |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,727,547 B2 | 5/2014 | McCabe et al. |
| 8,730,553 B2 | 5/2014 | De Wind et al. |
| 8,743,203 B2 | 6/2014 | Karner et al. |
| 8,876,342 B2 | 11/2014 | Wimbert et al. |
| 8,922,422 B2 | 12/2014 | Klar et al. |
| 9,090,213 B2 | 7/2015 | Lawlor et al. |
| 9,126,525 B2 | 9/2015 | Lynam et al. |
| 9,174,578 B2 | 11/2015 | Uken et al. |
| 9,280,202 B2 | 3/2016 | Gieseke et al. |
| 9,346,403 B2 | 5/2016 | Uken et al. |
| 9,405,120 B2 | 8/2016 | Graf et al. |
| 9,487,159 B2 | 11/2016 | Achenbach |
| 9,493,122 B2 | 11/2016 | Krebs |
| 9,598,016 B2 | 3/2017 | Blank et al. |
| 9,609,757 B2 | 3/2017 | Steigerwald |
| 9,616,815 B2 | 4/2017 | Mohan |
| 9,701,258 B2 | 7/2017 | Tiryaki |
| 9,827,913 B2 | 11/2017 | De Wind et al. |
| 9,878,669 B2 | 1/2018 | Kendall |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,247,941 B2 | 4/2019 | Fursich |
| 10,261,648 B2 | 4/2019 | Uken et al. |
| 10,264,219 B2 | 4/2019 | Mleczko et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,735,664 B2 | 8/2020 | Kunihiro |
| 10,769,434 B2 | 9/2020 | Weller et al. |
| 10,906,463 B2 | 2/2021 | Pflug et al. |
| 10,908,417 B2 | 2/2021 | Fürsich |
| 10,922,563 B2 | 2/2021 | Nix et al. |
| 10,946,798 B2 | 3/2021 | Fürsich et al. |
| 10,958,830 B2 | 3/2021 | Koravadi |
| 11,167,771 B2 | 11/2021 | Caron et al. |
| 11,201,994 B2 | 12/2021 | Ihlenburg et al. |
| 11,205,083 B2 | 12/2021 | Lynam |
| 11,214,199 B2 | 1/2022 | LaCross et al. |
| 11,240,427 B2 | 2/2022 | Koravadi |
| 11,242,008 B2 | 2/2022 | Blank et al. |
| 11,252,376 B2 | 2/2022 | Ihlenburg |
| 11,341,671 B2 | 5/2022 | Lu et al. |
| 11,348,374 B2 | 5/2022 | Kramer et al. |

(56) References Cited

U.S. PATENT DOCUMENTS

| | | |
|---|---|---|
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 11,639,134 B1 | 5/2023 | Huizen et al. |
| 11,691,567 B2 | 7/2023 | Huizen et al. |
| 11,780,372 B2 | 10/2023 | Sobecki et al. |
| 11,890,990 B2 | 2/2024 | Huizen et al. |
| 2001/0022550 A1 | 9/2001 | Steffel |
| 2002/0005999 A1 | 1/2002 | Hutzel et al. |
| 2002/0024713 A1 | 2/2002 | Roberts et al. |
| 2004/0252993 A1 | 12/2004 | Sato |
| 2006/0050018 A1 | 3/2006 | Hutzel et al. |
| 2006/0171704 A1 | 8/2006 | Bingle et al. |
| 2007/0182528 A1 | 8/2007 | Breed et al. |
| 2008/0310005 A1 | 12/2008 | Tonar et al. |
| 2009/0024436 A1 | 1/2009 | Ingman et al. |
| 2009/0040778 A1 | 2/2009 | Takayanagi et al. |
| 2009/0135493 A1 | 5/2009 | Takayanagi et al. |
| 2010/0085653 A1 | 4/2010 | Uken et al. |
| 2010/0214791 A1 | 8/2010 | Schofield |
| 2011/0080481 A1 | 4/2011 | Bellingham |
| 2011/0084198 A1 | 4/2011 | McCabe et al. |
| 2011/0188122 A1 | 8/2011 | Habibi et al. |
| 2012/0236136 A1 | 9/2012 | Boddy |
| 2013/0329184 A1* | 12/2013 | Barzak ............... B29D 11/0073 264/1.32 |
| 2014/0022390 A1 | 1/2014 | Blank et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2016/0221509 A1 | 8/2016 | Takada et al. |
| 2017/0177935 A1 | 6/2017 | Weller et al. |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0054899 A1 | 2/2019 | Hoyos et al. |
| 2019/0118717 A1 | 4/2019 | Blank et al. |
| 2019/0146297 A1* | 5/2019 | Lynam .................. G02F 1/153 359/265 |
| 2019/0168669 A1 | 6/2019 | Lintz et al. |
| 2019/0258131 A9 | 8/2019 | Lynam et al. |
| 2019/0364199 A1 | 11/2019 | Koravadi |
| 2019/0381938 A1 | 12/2019 | Hopkins |
| 2020/0143560 A1 | 5/2020 | Lu et al. |
| 2020/0148120 A1 | 5/2020 | Englander et al. |
| 2020/0186701 A1* | 6/2020 | Lintz .................. H04N 23/663 |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2022/0111857 A1 | 4/2022 | Kulkarni |
| 2022/0229309 A1 | 7/2022 | Laskin et al. |
| 2022/0242438 A1 | 8/2022 | Sobecki et al. |
| 2022/0252924 A1* | 8/2022 | Noble ............... G02F 1/133531 |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |
| 2023/0302994 A1 | 9/2023 | Miller et al. |
| 2024/0017610 A1 | 1/2024 | Ravichandran et al. |
| 2024/0064274 A1 | 2/2024 | Blank et al. |

\* cited by examiner

VEHICULAR CAMERA WITH POLARIZATION FILTER

CROSS REFERENCE TO RELATED APPLICATION

The present application claims the filing benefits of U.S. provisional application Ser. No. 63/364,681, filed May 13, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular occupant monitoring system includes a camera disposed at an interior rearview mirror assembly of a vehicle equipped with the vehicular occupant monitoring system that views the interior of the equipped vehicle and captures image data. The system includes an electronic control unit (ECU) with electronic circuitry and associated software. The electronic circuitry of the ECU includes an image processor for processing image data captured by the camera. The camera includes a CMOS imaging array sensor and a lens, and the CMOS imaging array includes at least one million photosensors arranged in rows and columns. The system includes a light polarization filter disposed between the CMOS imaging array sensor and the interior of the equipped vehicle such that light reflected off an occupant within the interior of the equipped vehicle passes through the light polarization filter and is polarized by the light polarization filter prior to reaching the CMOS imaging array sensor. The vehicular occupant monitoring system, via processing by the image processor of image data captured by the camera, determines presence of the occupant within the interior of the equipped vehicle These and other objects, advantages, purposes and features of the present invention will become apparent upon review of the following specification in conjunction with the drawings.

DESCRIPTION OF THE PREFERRED EMBODIMENTS

Figure 1:
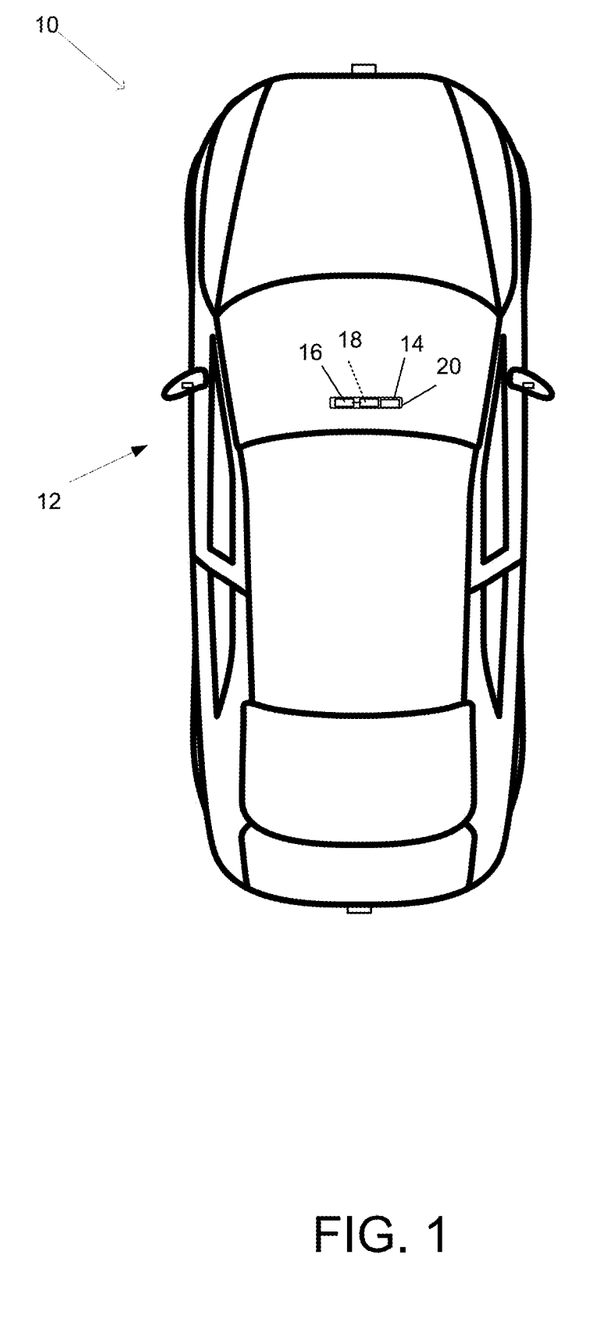
FIG. 1 is a plan view of a vehicle with a vision system that incorporates cameras.

Referring now to the drawings and the illustrative embodiments depicted therein, a vehicle 10 includes an imaging system or vision system 12 that includes at least one interior or driver monitoring camera 14 (FIG. 1). The vision system 12 includes a control (that comprises a processor) or electronic control unit (ECU) 18 that includes electronic circuitry and associated software, with the electronic circuitry comprising a processor that is operable to process image data captured by the camera to monitor the interior of the vehicle (e.g., the driver and/or passengers of the vehicle). The system may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
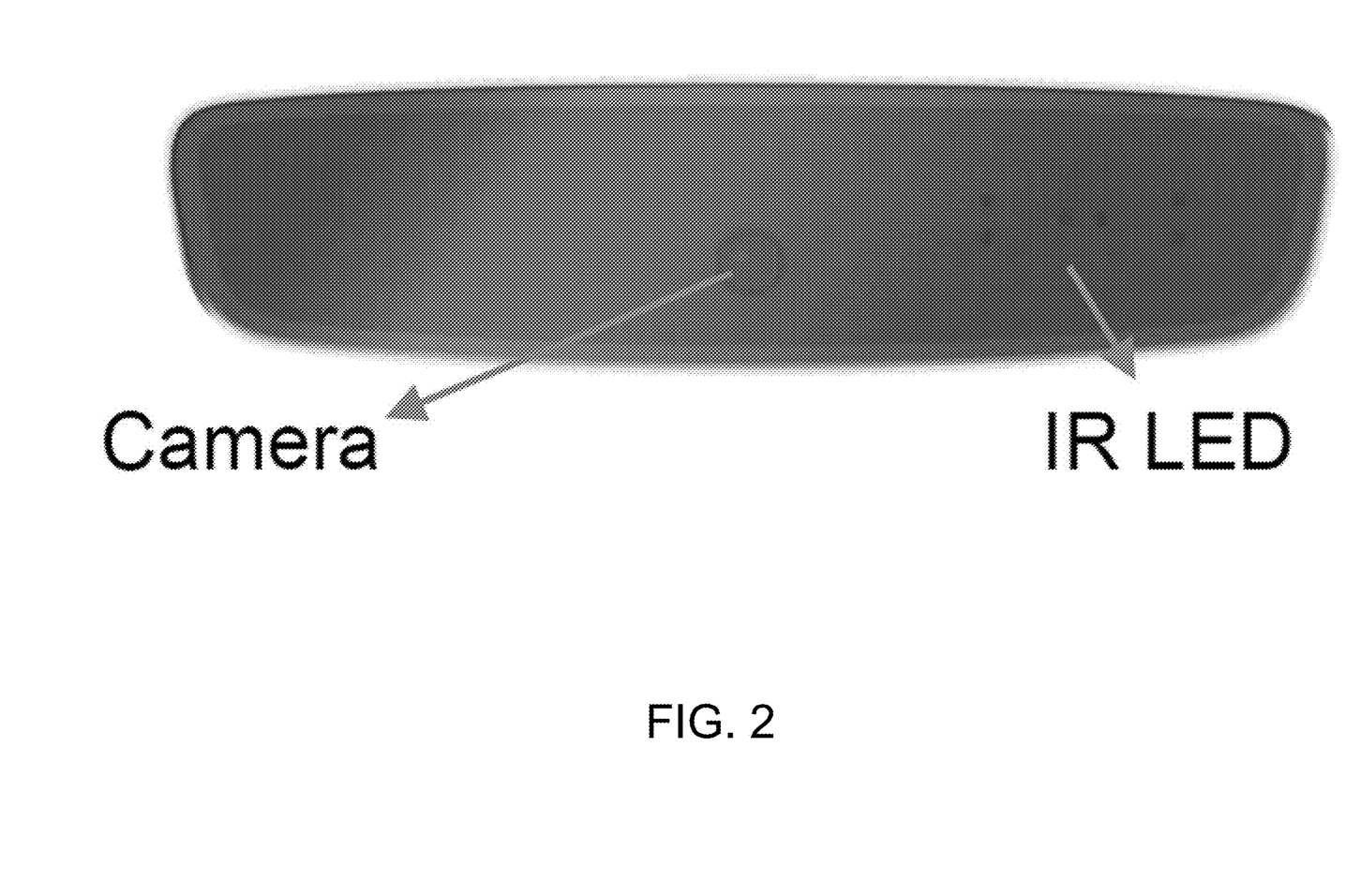
FIG. 2 is a perspective view of an interior rearview mirror.
Figure 3:
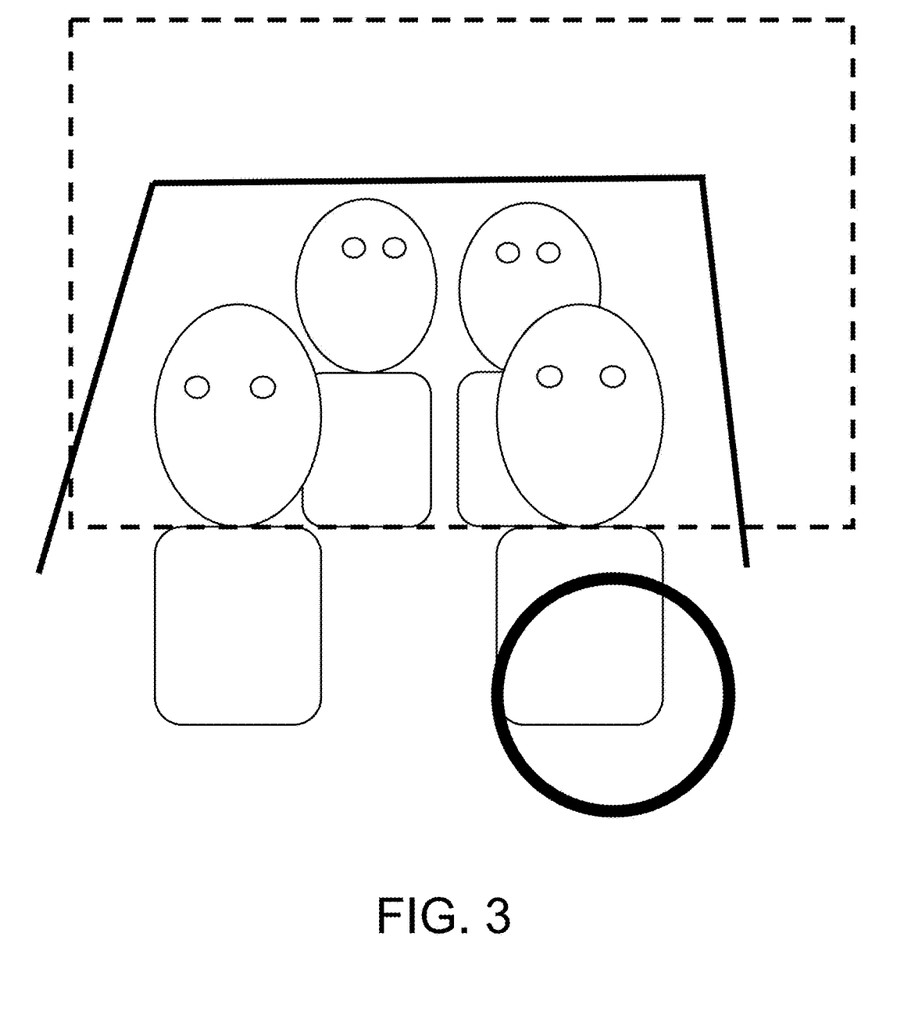
FIG. 3 is a schematic view of an exemplary field of view of the camera of FIG. 2.

For some driver monitoring systems (DMS) and/or occupant monitoring systems (OMS), an interior camera is integrated into the interior rearview mirror assembly 20. For example, as illustrated in FIG. 2, the rearview mirror includes a camera integrated behind the reflective surface of the mirror reflective element of the rearview mirror assembly. The mirror assembly may also include one or more illumination sources, such as one or more near infrared (near IR) LEDs or visible light LEDs to illuminate the scene for the camera to capture. As shown in FIG. 3, the camera position provides a field of view that includes some or all of the driver and/or passengers of the vehicle for assisting DMS and/or OMS (e.g., for tracking eyes, hands, distraction levels, number of passengers, comfort, health, etc.).

Figure 4:
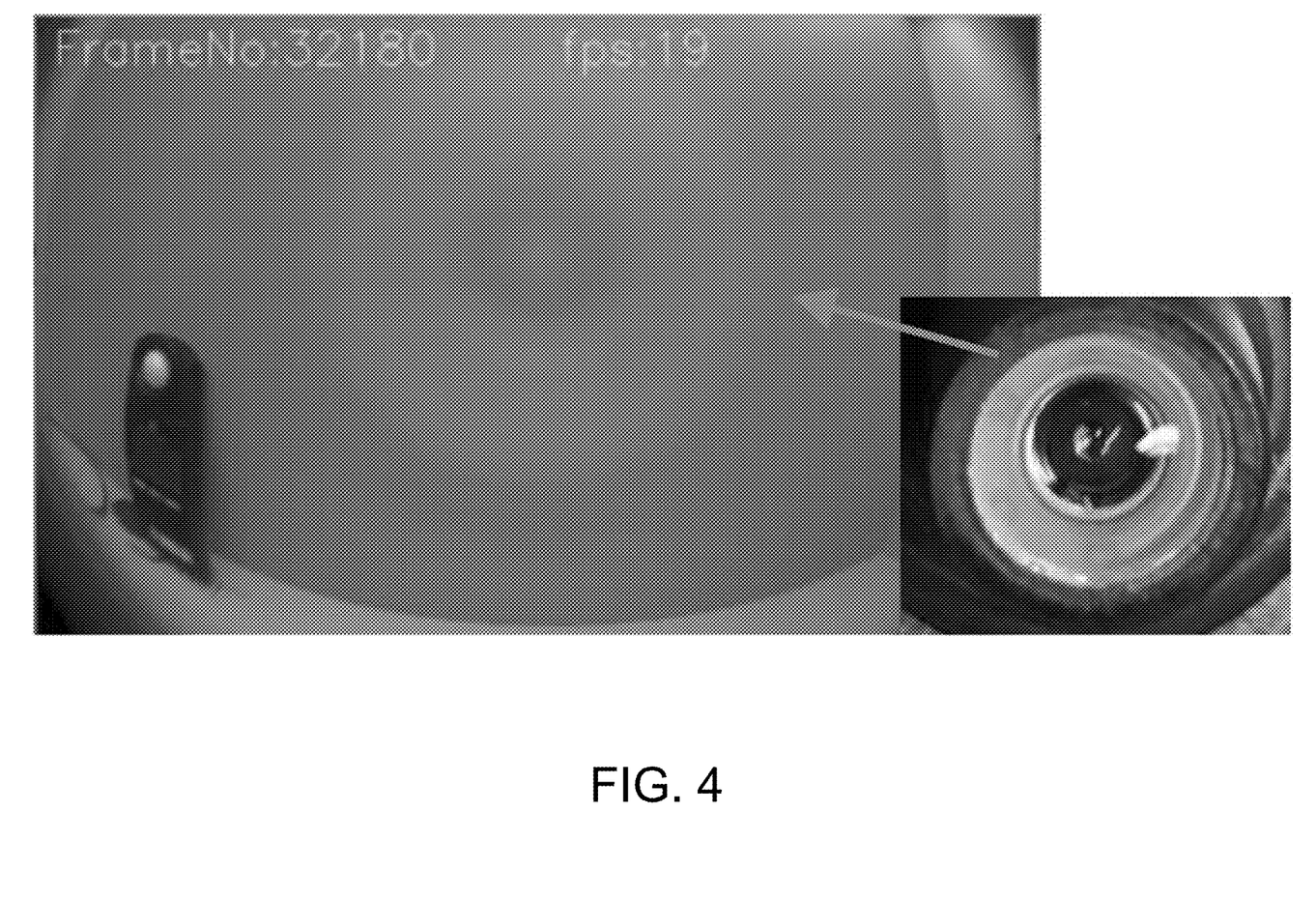
FIG. 4 is an image of reflections captured by a camera of an interior rearview mirror.

Referring now to FIG. 4, in some scenarios, an unintentional reflection or glare is present in image data captured by the camera. For example, the camera may capture reflections of visible light or IR from the mirror of the rearview mirror assembly, from items within the cabin of the vehicle (e.g., glasses or sunglasses worn by an occupant, windows, etc.). The glare caused by these reflections can impede DMS and OMS functionality.

Implementations herein include a polarization filter in front of the camera. For example, a polarization filter is included at or within the lens of the camera or is placed in front of the lens. For example, the surface of the mirror reflective element of the interior rearview mirror assembly may include a polarization filter that polarizes light that passes through the surface of the mirror reflective element to the camera. The polarization filter may be a coating directly on the lens of the camera or, alternatively, a separate element disposed in front of the lens of the camera. The polarization filter may include a linear polarizer, a circular polarizer, an elliptical light polarizer, or any combination thereof. Optionally, the camera may automatically rotate the polarization filter to minimize reflections/glare. For example, an actuator or the like may rotate the filter (e.g., may rotate a linear polarizer filter to adjust the orientation of the filter) using a rotatable collar, such as to reduce glare of light coming from a particular direction. The system may rotate the filter and capture images at various points during the rotation. Then, the system may compare the images to determine which rotation point resulted in the best image quality (e.g., reduced glare the most). The system may rotate the filter periodically and/or in response to detecting a threshold amount of glare.

Figure 5:
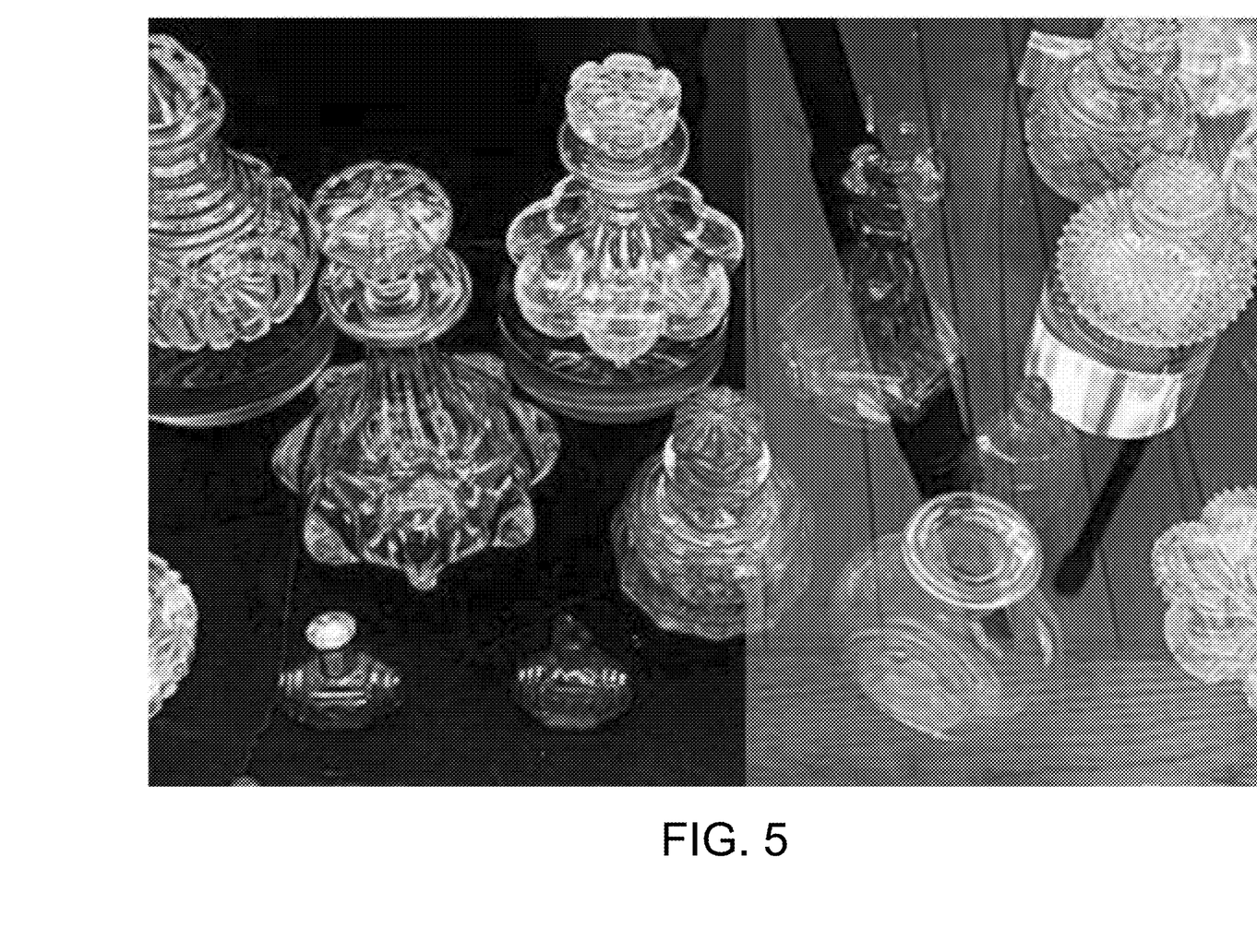
FIG. 5 is an image illustrating the use of a polarization filter.

As shown in FIG. 5, a polarization filter greatly reduces glare and reflections (the left side of the image) compared to non-polarized image data (the right side of the image). The polarization filter reduces ghost imaging that results from unintentional reflections between the mirror/lens and other reflective surfaces. By reducing these reflections, OMS and DMS monitoring may be increased and improved. For example, the eyes of an occupant may be tracked more accurately through personal glasses worn by the occupant. The polarization filter may improve the styling of the mirror in a way that the camera behind the mirror is not visible, while the transmittance in the visible light domain is reduced by the polarization filter (i.e., by reducing the amount of light reaching the camera, the camera will become less visible behind the mirror).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423; WO 2022/187805 and/or WO 2023/034956, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular occupant monitoring system, the vehicular occupant monitoring system comprising:
   a camera disposed at an interior rearview mirror assembly of a vehicle equipped with the vehicular occupant monitoring system and viewing interior of the equipped vehicle, the camera capturing image data;
   wherein the camera is disposed behind and views through a mirror reflective element of the interior rearview mirror assembly;
   an electronic control unit (ECU) comprising electronic circuitry and associated software;
   wherein the electronic circuitry of the ECU comprises an image processor for processing image data captured by the camera;
   wherein the camera comprises a CMOS imaging array sensor and a lens, and wherein the CMOS imaging array sensor comprises at least one million photosensors arranged in rows and columns;
   a light polarization filter disposed between the CMOS imaging array sensor and the interior of the equipped vehicle such that light reflected off an occupant within the interior of the equipped vehicle passes through the light polarization filter and is polarized by the light polarization filter prior to reaching the CMOS imaging array sensor;
   wherein the vehicular occupant monitoring system, via processing by the image processor of image data captured by the camera, determines presence of the occupant within the interior of the equipped vehicle; and
   wherein the vehicular occupant monitoring system, responsive to detecting glare at the camera, rotates the light polarization filter to reduce the glare.

2. The vehicular occupant monitoring system of claim 1, wherein the light polarization filter is disposed at the lens of the camera.

3. The vehicular occupant monitoring system of claim 2, wherein the light polarization filter comprises a coating on the lens of the camera.

4. A vehicular occupant monitoring system, the vehicular occupant monitoring system comprising:
   a camera disposed at an interior rearview mirror assembly of a vehicle equipped with the vehicular occupant monitoring system and viewing interior of the equipped vehicle, the camera capturing image data;
   an electronic control unit (ECU) comprising electronic circuitry and associated software;
   wherein the electronic circuitry of the ECU comprises an image processor for processing image data captured by the camera;
   wherein the camera comprises a CMOS imaging array sensor and a lens, and wherein the CMOS imaging array sensor comprises at least one million photosensors arranged in rows and columns;
   a light polarization filter disposed between the CMOS imaging array sensor and the interior of the equipped vehicle such that light reflected off an occupant within the interior of the equipped vehicle passes through the light polarization filter and is polarized by the light polarization filter prior to reaching the CMOS imaging array sensor;

wherein the vehicular occupant monitoring system, via processing by the image processor of image data captured by the camera, determines presence of the occupant within the interior of the equipped vehicle;

wherein the light polarization filter is disposed at a mirror reflective element of the interior rearview mirror assembly;

wherein the camera is disposed behind and views through the mirror reflective element of the interior rearview mirror assembly; and wherein the vehicular occupant monitoring system, responsive to detecting glare at the camera, rotates the light polarization filter to reduce the glare.

5. The vehicular occupant monitoring system of claim 1, further comprising a near infrared light emitting diode (LED) disposed at the interior rearview mirror assembly and operable to emit near infrared light to illuminate the interior of the equipped vehicle.

6. The vehicular occupant monitoring system of claim 1, further comprising a light emitting diode (LED) that emits visible light to illuminate the interior of the equipped vehicle.

7. The vehicular occupant monitoring system of claim 1, wherein the camera views at least a portion of a driver of the equipped vehicle.

8. The vehicular occupant monitoring system of claim 7, wherein the vehicular occupant monitoring system determines presence of the driver of the equipped vehicle, and wherein the vehicular occupant monitoring system, responsive to determining presence of the driver of the equipped vehicle, monitors at least one selected from the group consisting of (i) the hands of the driver and (ii) the eyes of the driver.

9. The vehicular occupant monitoring system of claim 1, wherein the camera views at least one passenger present in the interior of the equipped vehicle.

10. The vehicular occupant monitoring system of claim 1, wherein the light polarization filter comprises a linear light polarization filter.

11. The vehicular occupant monitoring system of claim 1, wherein the light polarization filter comprises a circular light polarization filter.

12. The vehicular occupant monitoring system of claim 1, wherein the light polarization filter comprises an elliptical light polarization filter.

13. A vehicular occupant monitoring system, the vehicular occupant monitoring system comprising:

a camera disposed at an interior rearview mirror assembly of a vehicle equipped with the vehicular occupant monitoring system and viewing interior of the equipped vehicle, the camera capturing image data;

an electronic control unit (ECU) comprising electronic circuitry and associated software;

wherein the electronic circuitry of the ECU comprises an image processor for processing image data captured by the camera;

wherein the camera comprises a CMOS imaging array sensor and a lens, and wherein the CMOS imaging array sensor comprises at least one million photosensors arranged in rows and columns;

a light polarization filter disposed between the CMOS imaging array sensor and the interior of the equipped vehicle such that light reflected off an occupant within the interior of the equipped vehicle passes through the light polarization filter and is polarized by the light polarization filter prior to reaching the CMOS imaging array sensor;

wherein the vehicular occupant monitoring system, via processing by the image processor of image data captured by the camera, determines presence of the occupant within the interior of the equipped vehicle;

wherein the vehicular occupant monitoring system, responsive to detecting glare at the camera, adjusts the light polarization filter to reduce the glare; and wherein adjusting the light polarization filter comprises rotating the light polarization filter.

14. The vehicular occupant monitoring system of claim 13, wherein the light polarization filter comprises a linear light polarization filter.

15. A vehicular occupant monitoring system, the vehicular occupant monitoring system comprising:

a camera disposed at an interior rearview mirror assembly of a vehicle equipped with the vehicular occupant monitoring system and viewing interior of the equipped vehicle, the camera capturing image data, and wherein the camera views at least a portion of a driver of the equipped vehicle;

wherein the camera is disposed behind and views through a mirror reflective element of the interior rearview mirror assembly;

an electronic control unit (ECU) comprising electronic circuitry and associated software;

wherein the electronic circuitry of the ECU comprises an image processor for processing image data captured by the camera;

wherein the camera comprises a CMOS imaging array sensor and a lens, and wherein the CMOS imaging array sensor comprises at least one million photosensors arranged in rows and columns;

a light polarization filter disposed at the lens of the camera such that light reflected off an occupant within the interior of the equipped vehicle passes through the light polarization filter and is polarized by the light polarization filter prior to reaching the CMOS imaging array sensor;

wherein the vehicular occupant monitoring system, via processing by the image processor of image data captured by the camera, determines presence of the occupant within the interior of the equipped vehicle; and wherein the vehicular occupant monitoring system, responsive to detecting glare at the camera, rotates the light polarization filter to reduce the glare.

16. The vehicular occupant monitoring system of claim 15, wherein the light polarization filter comprises a coating on the lens of the camera.

17. The vehicular occupant monitoring system of claim 15, further comprising a near infrared light emitting diode (LED) disposed at the interior rearview mirror assembly and operable to emit near infrared light to illuminate the interior of the equipped vehicle.

18. The vehicular occupant monitoring system of claim 15, further comprising a light emitting diode (LED) that emits visible light to illuminate the interior of the equipped vehicle.

19. A vehicular occupant monitoring system, the vehicular occupant monitoring system comprising:

a camera disposed at an interior rearview mirror assembly of a vehicle equipped with the vehicular occupant monitoring system and viewing interior of the equipped vehicle, the camera capturing image data, and wherein the camera views at least one passenger present in the interior of the equipped vehicle;

wherein the camera is disposed behind and views through a mirror reflective element of the interior rearview mirror assembly;

an electronic control unit (ECU) comprising electronic circuitry and associated software;

wherein the electronic circuitry of the ECU comprises an image processor for processing image data captured by the camera;

wherein the camera comprises a CMOS imaging array sensor and a lens, and wherein the CMOS imaging array sensor comprises at least one million photosensors arranged in rows and columns;

a light polarization filter disposed at the mirror reflective element of the interior rearview mirror assembly such that light reflected off an occupant within the interior of the equipped vehicle passes through the light polarization filter and is polarized by the light polarization filter prior to reaching the CMOS imaging array sensor;

wherein the vehicular occupant monitoring system, via processing by the image processor of image data captured by the camera, determines presence of the occupant within the interior of the equipped vehicle; and wherein the vehicular occupant monitoring system, responsive to detecting glare at the camera, rotates the light polarization filter to reduce the glare.

20. The vehicular occupant monitoring system of claim 19, wherein the light polarization filter comprises a linear light polarization filter.

21. The vehicular occupant monitoring system of claim 19, wherein the light polarization filter comprises a circular light polarization filter.

* * * * *